(12) United States Patent
Dighe et al.

(10) Patent No.: US 10,669,840 B2
(45) Date of Patent: Jun. 2, 2020

(54) DOWNHOLE SYSTEM HAVING TUBULAR WITH SIGNAL CONDUCTOR AND METHOD

(71) Applicant: BAKER HUGHES, A GE COMPANY, LLC, Houston, TX (US)

(72) Inventors: Shailesh Shashank Dighe, Katy, TX (US); Antonio Bottiglieri, Houston, TX (US); Andrew Christopher Holley, Conroe, TX (US); Li Li, Spring, TX (US); Timothy T. Ramsey, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 91 days.

(21) Appl. No.: 15/771,700

(22) PCT Filed: Sep. 30, 2016

(86) PCT No.: PCT/US2016/054605
§ 371 (c)(1),
(2) Date: Apr. 27, 2018

(87) PCT Pub. No.: WO2017/074644
PCT Pub. Date: May 4, 2017

(65) Prior Publication Data
US 2018/0347345 A1   Dec. 6, 2018

Related U.S. Application Data

(63) Continuation-in-part of application No. 14/924,611, filed on Oct. 27, 2015, now Pat. No. 10,125,604.

(51) Int. Cl.
*E21B 47/12* (2012.01)
*E21B 17/00* (2006.01)
(Continued)

(52) U.S. Cl.
CPC .......... *E21B 47/122* (2013.01); *E21B 17/003* (2013.01); *E21B 17/1021* (2013.01);
(Continued)

(58) Field of Classification Search
CPC ............... E21B 17/003; E21B 17/1021; E21B 17/1078; E21B 17/028; E21B 17/023;
(Continued)

(56) References Cited

U.S. PATENT DOCUMENTS 4,001,774 A * 1/1977 Dawson ................ E21B 17/003
340/854.6
4,496,203 A * 1/1985 Meadows ............. E21B 17/028
439/194
(Continued)

OTHER PUBLICATIONS

International Search Report for International Application No. PCT/US2016/054605; dated Dec. 22, 2016; 7 pages.
(Continued)

*Primary Examiner* — Matthew R Buck
*Assistant Examiner* — Aaron L Lembo
(74) *Attorney, Agent, or Firm* — Cantor Colburn LLP (57) ABSTRACT

A downhole system (10, 110, 210) includes a tubular (18) having a longitudinal axis (32), and a trace (46) applied on the tubular (18). The trace (46) includes a conductive portion (60) formed from an electrically conductive material (58) and the trace (46) is configured to deliver a signal between uphole and downhole locations of the tubular (18).

16 Claims, 8 Drawing Sheets

(51) Int. Cl.
*E21B 17/10* (2006.01)
*E21B 33/14* (2006.01)
*E21B 47/00* (2012.01)
*G01V 11/00* (2006.01)

(52) U.S. Cl.
CPC .......... *E21B 17/1078* (2013.01); *E21B 33/14* (2013.01); *E21B 47/0005* (2013.01); *G01V 11/002* (2013.01)

(58) Field of Classification Search
CPC .... E21B 47/122; E21B 47/0005; E21B 33/14; G01V 11/002; F16L 25/01; F16L 25/02
See application file for complete search history.

(56) References Cited

U.S. PATENT DOCUMENTS

| | | | | |
|---|---|---|---|---|
| 5,211,223 | A * | 5/1993 | Mulville | E21B 36/04 |
| | | | | 166/60 |
| 5,226,332 | A * | 7/1993 | Wassell | E21B 47/00 |
| | | | | 175/40 |
| 6,131,658 | A * | 10/2000 | Minear | E21B 17/1028 |
| | | | | 166/250.01 |
| 6,192,983 | B1 * | 2/2001 | Neuroth | E21B 17/028 |
| | | | | 166/250.15 |
| 6,323,420 | B1 * | 11/2001 | Head | F16L 7/00 |
| | | | | 174/47 |
| 6,331,242 | B1 * | 12/2001 | Horton | C23F 13/16 |
| | | | | 204/196.1 |
| 6,459,383 | B1 * | 10/2002 | Delatorre | E21B 47/122 |
| | | | | 166/250.11 |
| 6,515,592 | B1 * | 2/2003 | Babour | G01V 11/002 |
| | | | | 340/854.4 |
| 6,561,229 | B2 * | 5/2003 | Wellman | F16L 9/14 |
| | | | | 138/132 |
| 6,670,880 | B1 * | 12/2003 | Hall | E21B 17/028 |
| | | | | 336/132 |
| 6,844,498 | B2 * | 1/2005 | Hall | E21B 17/003 |
| | | | | 174/75 C |
| 7,152,685 | B2 * | 12/2006 | Adnan | E21B 17/206 |
| | | | | 166/380 |
| 7,228,912 | B2 * | 6/2007 | Patel | E21B 17/026 |
| | | | | 166/380 |
| 7,287,684 | B2 * | 10/2007 | Blackburne, Jr. | B01D 29/111 |
| | | | | 228/130 |
| 7,414,918 | B2 * | 8/2008 | Hurst | G01V 1/46 |
| | | | | 181/105 |
| 8,353,205 | B2 * | 1/2013 | Cheon | G01V 1/40 |
| | | | | 73/152.58 |
| 8,809,689 | B2 * | 8/2014 | Olden | H05K 1/0366 |
| | | | | 164/262 |
| 8,964,504 | B2 * | 2/2015 | Chace | G01V 5/101 |
| | | | | 250/269.4 |
| 9,044,798 | B2 * | 6/2015 | Peter | B21C 23/085 |
| 9,494,033 | B2 * | 11/2016 | Taherian | E21B 47/14 |
| 2002/0113716 | A1 * | 8/2002 | Aiello | E21B 17/003 |
| | | | | 340/853.1 |
| 2003/0084716 | A1 * | 5/2003 | Patey | E21B 17/028 |
| | | | | 73/152.18 |
| 2004/0040707 | A1 * | 3/2004 | Dusterhoft | E21B 17/206 |
| | | | | 166/279 |
| 2004/0262013 | A1 * | 12/2004 | Tilton | E21B 4/02 |
| | | | | 166/380 |
| 2005/0231382 | A1 * | 10/2005 | Richardson | G01V 11/002 |
| | | | | 340/854.5 |
| 2006/0151179 | A1 * | 7/2006 | Boyadjieff | E21B 17/003 |
| | | | | 166/380 |
| 2007/0211572 | A1 * | 9/2007 | Reiderman | B06B 1/04 |
| | | | | 367/35 |
| 2009/0034368 | A1 * | 2/2009 | Johnson | E21B 47/14 |
| | | | | 367/83 |
| 2009/0166087 | A1 * | 7/2009 | Braden | E21B 17/028 |
| | | | | 175/40 |
| 2010/0224409 | A1 * | 9/2010 | Sarhad | E21B 17/003 |
| | | | | 175/40 |
| 2011/0017334 | A1 * | 1/2011 | Peter | B21C 23/085 |
| | | | | 138/103 |
| 2011/0024103 | A1 * | 2/2011 | Storm, Jr. | E21B 17/206 |
| | | | | 166/65.1 |
| 2011/0309949 | A1 * | 12/2011 | Dopf | E21B 17/003 |
| | | | | 340/854.6 |
| 2012/0069705 | A1 * | 3/2012 | Zhao | E21B 47/0005 |
| | | | | 367/35 |
| 2012/0132007 | A1 * | 5/2012 | Dria | E21B 47/0005 |
| | | | | 73/760 |
| 2013/0213129 | A1 * | 8/2013 | Kumar | E21B 47/011 |
| | | | | 73/152.47 |
| 2015/0315898 | A1 * | 11/2015 | Marland | E21B 33/14 |
| | | | | 166/250.14 |
| 2015/0319860 | A1 * | 11/2015 | Corisis | H01L 23/66 |
| | | | | 174/266 |
| 2016/0111183 | A1 * | 4/2016 | Mast | B32B 1/00 |
| | | | | 385/107 |
| 2017/0114608 | A1 * | 4/2017 | Dighe | E21B 33/12 |
| 2017/0114631 | A1 | 4/2017 | Dighe et al. | |
| 2017/0204719 | A1 * | 7/2017 | Babakhani | E21B 47/0005 |
| 2017/0235012 | A1 * | 8/2017 | Itskovich | E21B 7/04 |
| | | | | 175/24 |
| 2017/0268944 | A1 * | 9/2017 | Nunes | E21B 47/12 |
| 2017/0342826 | A1 * | 11/2017 | Wilson | G01V 11/002 |
| 2018/0017697 | A1 * | 1/2018 | Fouda | E21B 47/123 |
| 2018/0283164 | A1 * | 10/2018 | Roberson | E21B 47/0005 |
| 2019/0284931 | A1 * | 9/2019 | Reinsch | E21B 47/16 |

OTHER PUBLICATIONS

McNicoll, A. et al., "Liquid lights and musical posters: Welcome to the world of electric paint"; www.cnn.com, 2013, 2 pages.

Written Opinion of the International Search Report for International Application No. PCT/US2016/054605; dated Dec. 22, 2016; 11 pages.

* cited by examiner

DOWNHOLE SYSTEM HAVING TUBULAR WITH SIGNAL CONDUCTOR AND METHOD

CROSS REFERENCE TO RELATED APPLICATIONS

This application is a 371 of International Application PCT/US2016/054605, filed Sep. 30, 2016 which claims priority to U.S. application Ser. No. 14/924,611, filed Oct. 27, 2015, both of which are incorporated herein by reference in their entirety.

BACKGROUND

In the drilling and completion industry, the formation of boreholes for the purpose of production or injection of fluid is common. The boreholes are used for exploration or extraction of natural resources such as hydrocarbons, oil, gas, water, and alternatively for $CO_2$ sequestration. To form the borehole, a drill pipe may be used. Control lines are sometimes passed through the drill pipe to send signals to and from a bottom hole assembly. Downhole production boreholes utilized in subterranean operations typically utilize casings disposed therein, along with zonal isolation material which may be cement in some cases, to protect the borehole from downhole pressures, chemical reactions and other conditions and prevent failures such as borehole collapse, burst, and tensile failures. Casings can also be used to define production zones in various portions of the borehole.

Casing and zonal isolation material monitoring and evaluation techniques are important tools in maintaining the integrity of the zonal isolation, and in turn maintaining the integrity of the borehole. Evaluation and maintenance procedures involve interrogating the casing and cement that is used to bond the casing to a borehole wall to determine whether voids are present between the casing and the borehole wall. Well logging tools are utilized to make the interrogation, such as wireline tools that convey an interrogator inside of the casing to the location for interrogation. Such wireline tools require personnel to deliver the tool for interrogation and retrieve the tool subsequent completion of an interrogation operation. Interpretation of the logs may then occur.

For tubulars that pass through open or cased boreholes, such as for production, control lines may be passed through the interior of the tubular for controlling downhole tools or sending signals to an uphole location. Such control lines are attached by personnel at the well site which takes time.

The art would be receptive to alternative devices and methods for transmitting signals downhole such as but not limited to mud pulse telemetry.

BRIEF DESCRIPTION

A downhole system includes a tubular having a longitudinal axis, and a trace applied on the tubular. The trace includes a conductive portion formed from an electrically conductive material and the trace is configured to deliver a signal and/or power between uphole and downhole locations of the tubular.

A method of signal and/or power transmission along a downhole tubular includes positioning the tubular within a borehole, and delivering a signal and/or power along an electrically conductive trace painted, etched, or printed on an interior surface and/or an exterior surface of the tubular.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
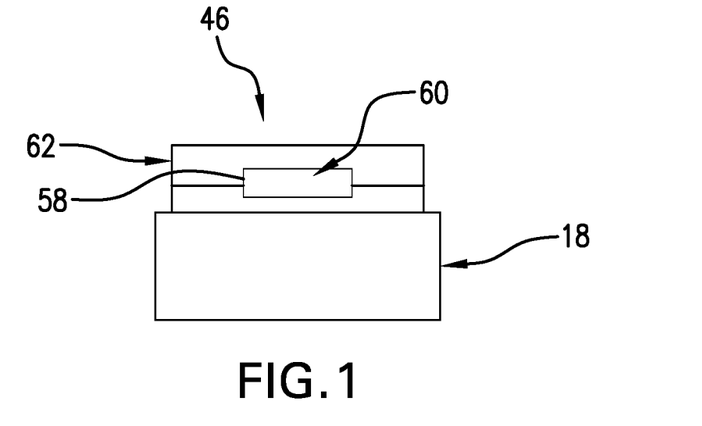
FIG. 1 depicts a partial sectional view of a tubular having an embodiment of a conductive trace applied thereon.

With reference to FIG. 1, embodiments described herein employ one or more signal conductors formed as conductive traces 46 formed or applied, such as painted, printed or etched onto a surface of a tubular 18. As will be further described below, the tubular 18 may be employed for various downhole applications, such as, but not limited to, casing, coiled tubing, drill pipe, piping segments, protective shrouds, production tubing, etc. Also, the traces 46 may be formed or applied onto one or both an interior surface or an exterior surface and used for data transmission and/or power transmission. That is, the traces 46 are configured to deliver any signal, such as, but not limited to any electrical signal, any signal for data transmission, a start or stop signal, an analog or digital signal, a signal indicative of a sensed condition, and/or electric power signal from and/or to a downhole location and between uphole and downhole locations of the tubular 18. Thus, a "signal" referred to herein may include any signal unless otherwise specified. The conductive trace 46 includes an electrically conductive portion 60 and may further include a non-conductive (electrically insulative) portion 62. The conductive portion 60 is formed using a conductive material 58. The conductive material 58 may include materials such as paint, ink, or film applied to the tubular 18, or may alternatively be etched onto the tubular 18. The conductive material 58 may include, but is not limited to, copper, silver, and graphite-based paint or ink, or any other conductive particles or powders, or combination of conductive particles or powders such as those including metal, mixed with a paintable or printable medium which can be applied to the tubular 18. In one embodiment, the conductive material 58 is formed from a material, such as a paint or ink, which changes from a liquid state to a solid state. The non-conductive portion 62 may be applied over the conductive portion 60, or alternatively the non-conductive portion 62 may be part of the conductive material 58 which is applied concurrently with the conductive portion 60. For example, a paintable medium can be selected which allows the conductive portion 60 to settle therein, leaving an isolating non-conductive portion 62 covering the conductive portion 60. Alternatively, the conductive traces 46 may be formed using a two-stage process by first applying the conductive material 58 onto the tubular 18 to form the conductive portion, and then applying a non-conductive material on top of the conductive material 58 to form the non-conductive portion 62. The non-conductive portion 62 may also be interposed between the tubular 18 and the conductive material 58. Some of the non-conductive portion 62 may also be used to electrically isolate the conductive trace 46 from a conductive connector 44 (see FIG. 3), if the conductive trace 46 and connector 44 are not meant to be electrically connected. The conductive connectors 44 also include a conductive material 58 applied or etched onto the tubular 18, and may be formed in a similar fashion as described for the conductive traces 46, although in some embodiments the conductive connectors 44 may not include the non-conductive portion 62, as will be further described below.

Figure 2:
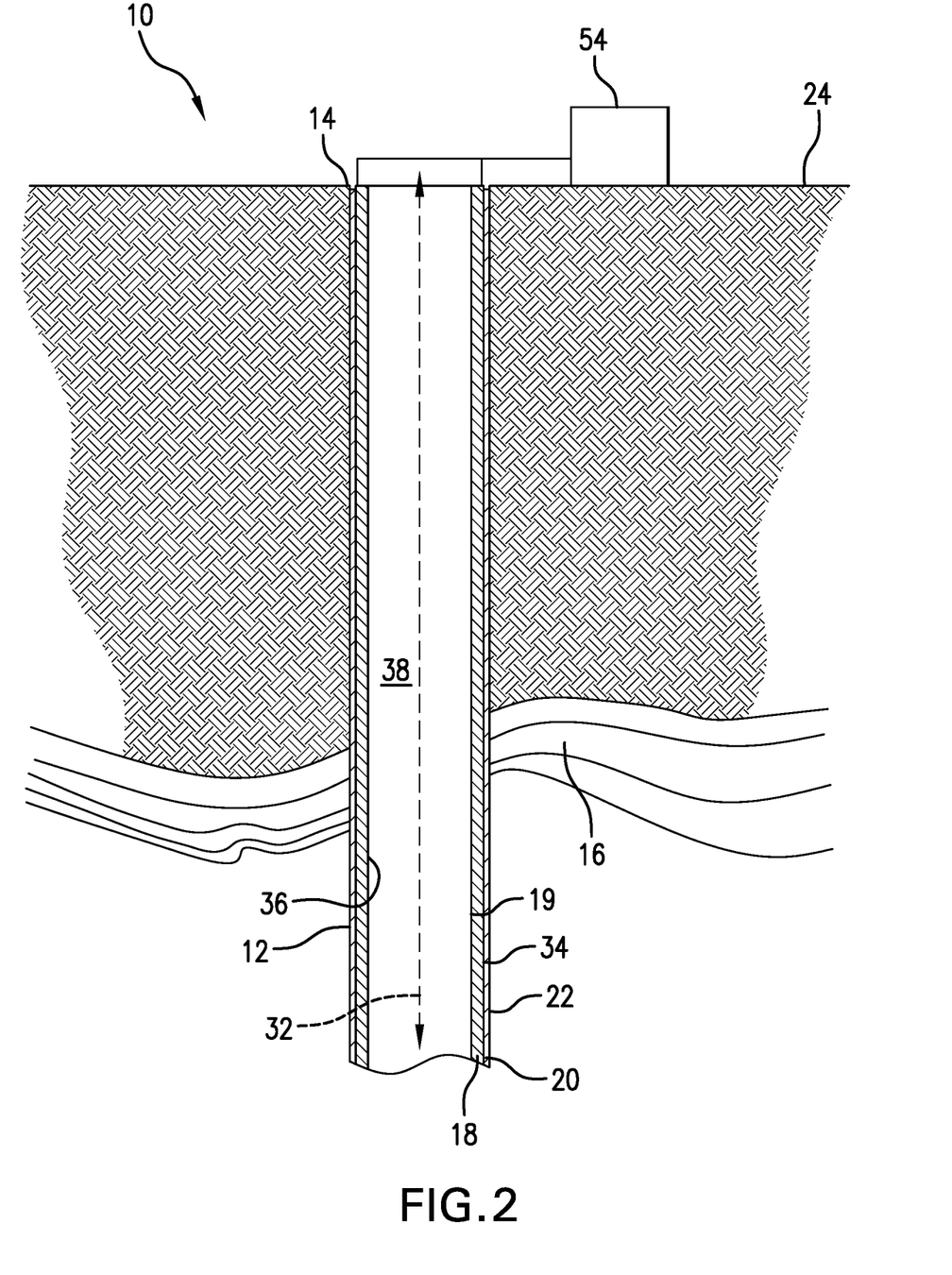
FIG. 2 depicts a side sectional and schematic view of an embodiment of a tubular signal transmission system using casing in a borehole.

The tubular 18 may be made from any material suitable for withstanding downhole conditions such as pressure, temperature and chemical reaction. Non-limiting examples of such materials include steel, heat treated carbon steel, stainless steel, aluminum, titanium, fiberglass and other materials. In one embodiment, the tubular 18 includes a plurality tubular sections 30 (FIG. 3), such as pipe segments or casing joints, connected together via threaded ends or threaded joints or other connection mechanisms to achieve a sufficient length for a borehole 14 (FIG. 2). Alternatively the tubular 18 may be continuous without joints, such as the coiled tubing 90 (FIG. 6) and the tubular 18 may extend any length of the borehole 14. For example, the borehole 14 may include a full tubular 18 extending from a surface 24 or near surface location to a selected depth or a liner such as a production liner that is suspended in the borehole 14.

Referring to FIG. 2, one embodiment of a downhole system, in particular a tubular signal transmission system 10 that employs at least one conductive trace 46 (see FIGS. 1 and 3) is shown to include the tubular 18 disposed in the borehole 14, the borehole 14 having a borehole wall 12. In the embodiment illustrated in FIG. 2, the tubular 18 is employed as a casing 19. The borehole 14 penetrates at least one earth formation 16 during a subterranean operation. As described herein, a "formation" refers to the various features and materials that may be encountered in a subsurface environment and surround the borehole 14. While the borehole 14 is illustrated as extending substantially vertically from the surface 24, it should be understood that the borehole 14 may additionally include portions that extend in directions deviating from vertical, including but not limited to portions that extend parallel or substantially parallel to the surface 24 to form a horizontal well. The tubular 18 when employed as casing 19 may be cemented or bonded to the borehole wall 12 via a casing support material 20 such as, but not limited to, cement 22 or any other zonal isolation material that includes any suitable cementing or other material or combination of materials sufficient to bond the tubular 18 to the borehole wall 12, facilitate the tubular 18 in supporting and/or isolating portions of the borehole 14, or otherwise support the tubular 18. In one embodiment, the casing support material 20 is cement 22. The cement 22 may include a material or mixture that is forced into a space between the tubular 18 and the borehole wall 12 and serves to bond the tubular 18 to the borehole wall 12 to form a cement sheath surrounding the tubular 18. The casing support material 20 may further include one or more expandable packers (not shown) as an alternative to or in addition to the cement 22, as well as any other suitable bonding agent for the type of formation 16 through which the borehole 14 extends. While the system 10 is useful in operations with a cemented or otherwise bonded tubular 18, the application of the tubular 18 is not limited to any particular casing support material 20 when employed as casing 19. The tubular 18 may also be employed in any other downhole operation requiring a tubular.

Figure 3:
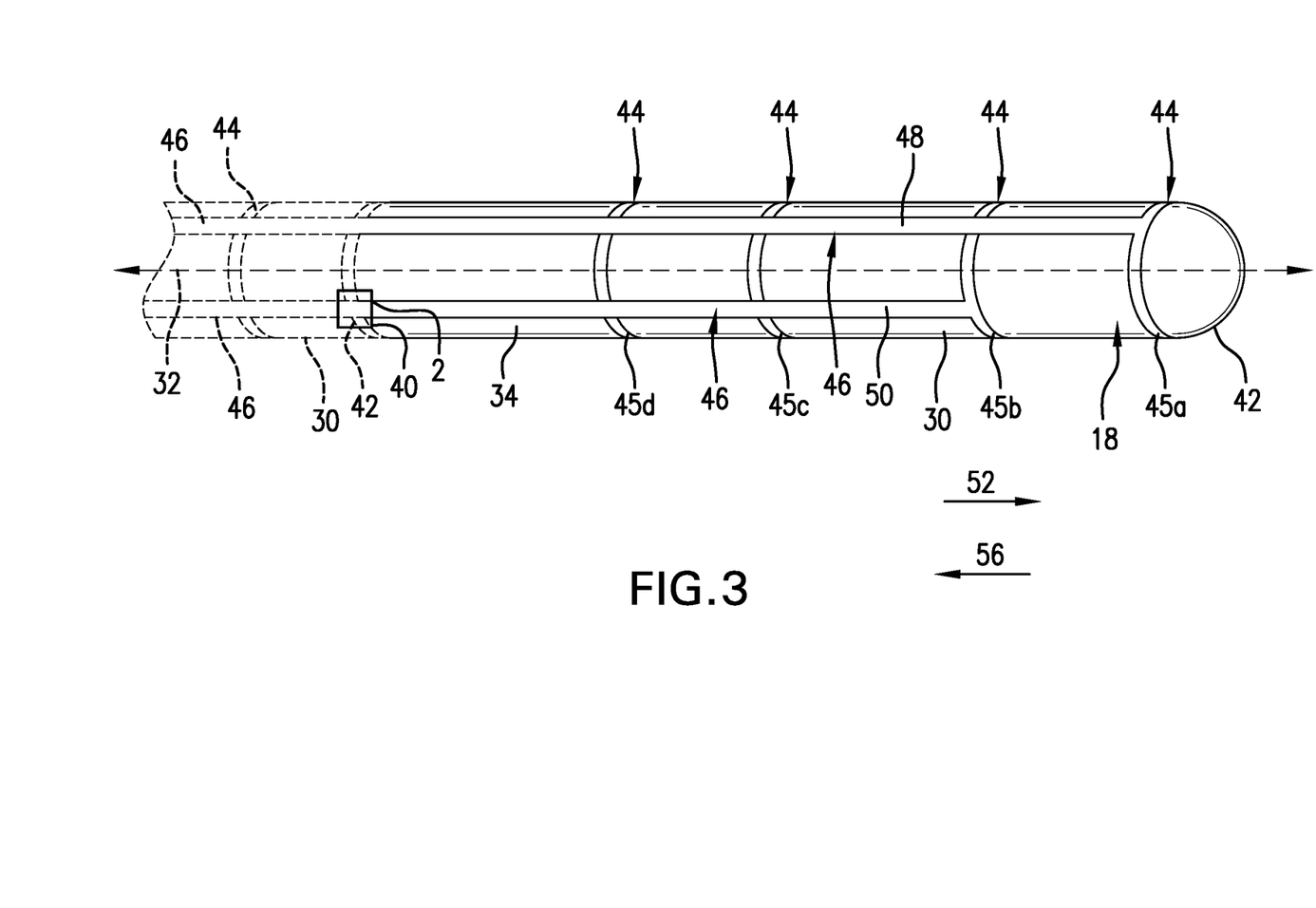
FIG. 3 depicts a perspective view of an embodiment of sections of a tubular within the tubular signal transmission system of FIG. 2.

In an embodiment where the tubular 18 is formed of a plurality of sections 30, FIG. 3 depicts an embodiment of the tubular section 30 of the tubular 18, with one adjacent tubular section 30 shown in phantom. The tubular 18 may include a plurality of tubular sections 30 to make up the full length of the tubular 18. The tubular section 30 extends along a longitudinal axis 32 and includes an exterior surface 34, which faces the casing support material 20 and borehole wall 12 (FIG. 2) when used as casing 19, and an interior surface 36 (radially interior to the exterior surface 34) defining a flowbore or space 38 for receiving a production string, coiled tubing, or downhole tools. Each tubular section 30 includes a first end 40, such as an uphole end, and a second end 42, such as a downhole end. The tubular section 30 may be attached to one or more tubular sections 30, or interconnecting joints may be utilized to connect adjacent tubular sections 30 together.

In one embodiment, the tubular section 30 includes one or more conductive connectors 44, which in one embodiment, encircle a surface of the tubular 18, such as the exterior surface 34 of the tubular section 30 to form conductive rings. In the illustrated embodiment, four conductive connectors 44 are provided on the tubular section 30, such as first, second, third, and fourth conductive connectors 45a, 45b, 45c, and 45d. The conductive connectors 44 may occupy distinct longitudinal areas of the tubular section 30. That is, adjacent conductive connectors 44 may be longitudinally separated from each other. Also in the illustrated embodiment, the tubular section 30 further includes at least two longitudinally extending conductive traces 46, which may be applied on the exterior surface 34 as described above with respect to FIG. 1. The conductive traces 46 are respectively electrically connected to conductive connectors 44, but not to each other in the wellbore. That is, in the illustrated embodiment, a first conductive trace 48 is electrically connected to the first conductive connector 45a but not the second conductive connector 45b, and a second conductive trace 50 is electrically connected to the second conductive connector 45b but not the first conductive connector 45a. In one embodiment, third and fourth conductive traces (not shown) may be electrically connected to the third and fourth conductive connectors 45c and 45d. The conductive traces 46 serve as signal conductors for the system 10. The conductive traces 46 may also occupy distinct radial areas of the tubular section 30. That is, adjacent conductive traces 46 are radially separated from each other. While only two conductive traces 46 are illustrated, the tubular 18 may include more than two conductive traces 46 radially dispersed about the exterior surface 34. The number of conductive traces 46 is only dependent on the width and number of the conductive traces 46 and the circumference of the tubular 18. The first and second conductive traces 48, 50 may have different lengths along the tubular section 30 such that the first and second conductive traces 48, 50 extend to different depths when installed within the borehole 14. For example, the first conductive trace 48 extends further into the borehole 14 (and further from the surface 24) than the second conductive trace 50. When more than two conductive traces 46 are included, they may all extend at different lengths along the tubular section 30. In some tubular sections 30, at least one of the first and second conductive traces 48, 50 extends to the second end 42 to connect with a conductive trace 46 or conductive connector 44 on an adjacent tubular section 30 connected to its own first end 40. The conductive traces 46 are aligned correctly with conductive traces 46 on adjacent tubular section 30 during makeup of the tubular 18 to assure continuity in signal transmission along the length of the tubular 18. While the conductive traces 46 are described as formed on sections 30 of the tubular 18, the tubular 18 may include only one section, or may be a continuous uninterrupted tubular, in which case the conductive traces 46 may be arranged on the tubular 18 as needed.

In one embodiment, such as shown in FIGS. 2 and 3, the conductive traces 46 allow collection/transmission of data regarding cement condition at various depths and transmit the data to the surface by the conductive traces 46 via signals in an uphole direction 56. By providing varying depths in which the conductive traces 46 extend within the borehole 14, measurements can be taken by looking at values across two conductive traces 46 at different depths, such as first and second conductive traces 48, 50. The conductive traces 46 are respectively electrically connected to the conductive connectors 44, which may also be conductive traces. When the conductive connectors 44 are ring shaped as illustrated, the connectors 44 are able to obtain data all around the circumference of the tubular 18, at the depths at which they are positioned, rather than from just one radial location of the tubular 18. The connection between the conductive connectors 44 and their respective conductive traces 46 allows the conductive traces 46 to transmit signals obtained from the connectors 44 to the surface 24. Changes in electrical properties in the cement 22 over time from placement onwards can be analyzed, to determine state of cement (liquid, gel, solid) and if there is any damage to the cement 22 or if there are any fluid invasions in the annulus between the exterior surface 36 of the tubular 18 and the borehole wall 12. A control system 54 (FIG. 2) is schematically illustrated at the surface 24 to receive, store, analyze and/or relay any signals transmitted by any of the conductive traces 46 disposed on the tubular 18. The control system 54 may also or alternatively relay the signals to a remote location for further processing. Because the conductive traces 46 and conductive connectors 44 are always in place, data can be collected continuously for the life of the well and in real time. Monitoring of the sheath of cement 22 and the tubular 18 can occur in real-time and span from the initial physical placement of the tubular 18 into the borehole 14 throughout the entire life of the well or the life of the components within the well. Alternatively, or additionally, the control system 54 may be used to direct signals in a downhole direction 52 along one or a plurality of the conductive traces 46, such as for downhole power transmission.

By applying the conductive traces 46 and conductive connectors 44 onto the exterior surface 36 of the tubular 18, as illustrated in FIG. 3, the conductive traces 46 and conductive connectors 44 are positioned at locations interfacing directly with both the tubular 18 as well as the casing support material 20.

Figure 4:
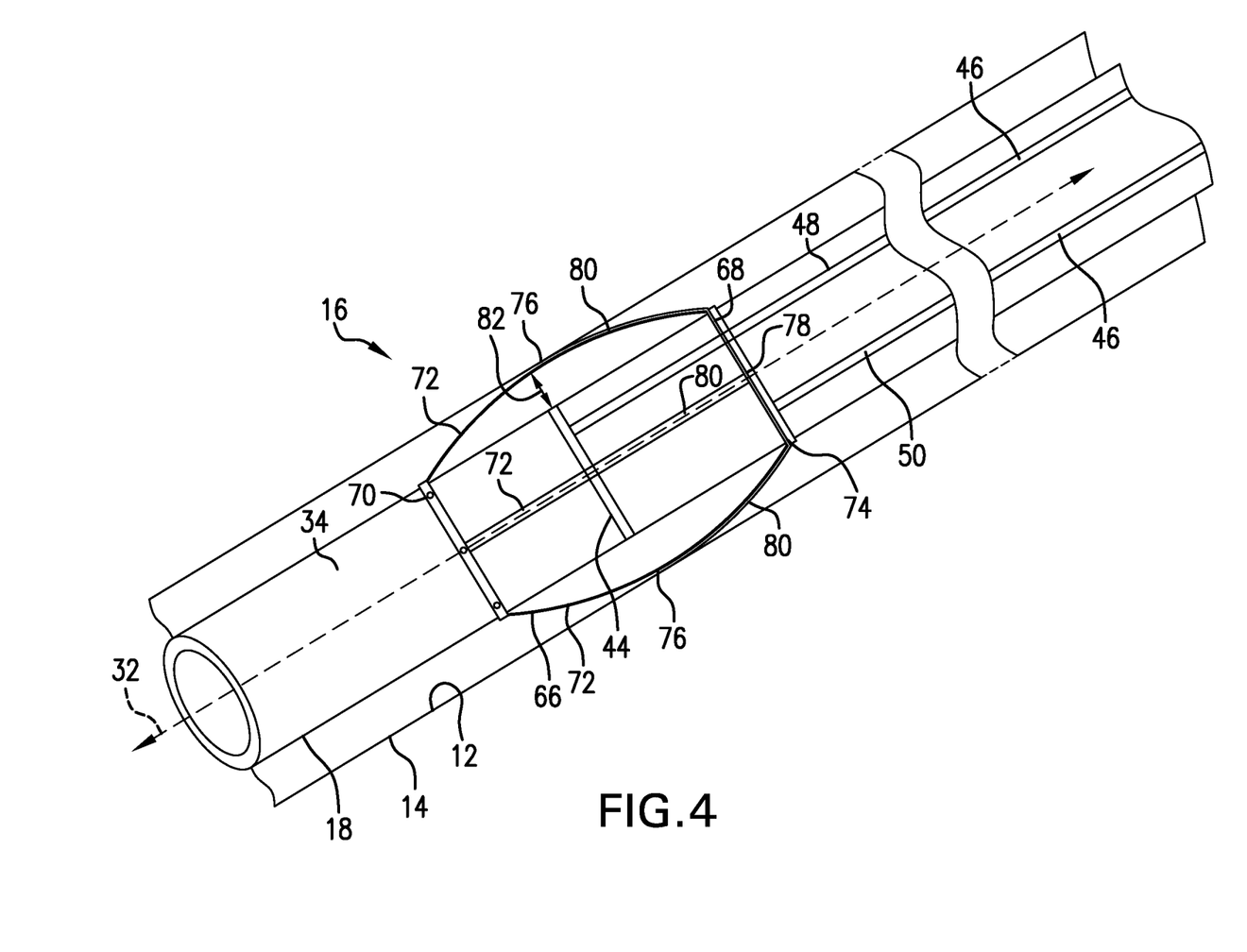
FIG. 4 depicts a schematic view of an embodiment of a centralizer on a tubular within a tubular signal transmission system.

Another embodiment of utilizing the tubular 18 with conductive traces 46 formed from conductive material 58 is shown in FIG. 4. The tubular 18, defining any downhole piping or casing, is shown within the borehole 14, and spaced from the borehole wall 12 (or from another tubular 18) by a centralizer 66 disposed on the exterior surface 34 of the tubular 18. The centralizer 66 may include ends defined by a first ring 68 and a second ring 70, each disposed about the exterior surface 34 of the tubular 18. The centralizer 66 may further include a plurality of expandable spacers 72 which interconnect the first ring 68 and the second ring 70 and which help space the tubular 18 from the borehole wall 12 (or from another tubular 18). The spacers 72 may lie substantially flat against the exterior surface 34 during run-in of the tubular 18 into the borehole 14, and then the centralizer 66 may be set into place using any known mechanical, electrical, or hydraulic actuator to expand the spacers 72 into the bowed position shown in FIG. 4, such as by reducing the distance between the first and second rings 68, 70, to centralize the tubular 18 within the borehole 14. As in the previous embodiments, conductive traces 46 are applied on the tubular 18, and in the illustrated embodiment, the conductive traces 46 are applied on the exterior surface 34 of the tubular 18, one or more conductive traces 46 may additionally be applied on the interior surface 36 of the tubular 18 as required. At least one conductive connector 44 is also applied on the tubular 18, and at a location along the tubular 18 that is longitudinally disposed within an area encompassed by the centralizer 66, between the first and second rings 68, 70. At least one of the conductive traces 46, such as first conductive trace 48, extends to the conductive connector 44. Also, at least one of the conductive traces 46, such as second conductive trace 50, is electrically connected to a third conductive trace 74 applied on the centralizer 66. In particular, the third conductive trace 74 includes a first portion 78 applied along the first ring 68 and one or second portions 80 applied along at least a portion of at least one of the spacers 72. As shown, the second portions 80 of the third conductive trace 74 are applied on approximately half the length of each of the spacers 72. Ends 76 of the second portions 80 of the third conductive trace 74 located on the spacers 72 may be left exposed. That is, the ends 76 may be uncovered by a non-conductive portion 62. The ends 76 of the third conductive trace 74 are substantially longitudinally aligned with the conductive connector 44 when the centralizer 66 is in the set position shown in FIG. 4. The conductive connector 44 continuously provides data regarding a distance 82 between the tubular 18 and the borehole wall 12 (or interior surface of another tubular 18) by detecting the electrical properties between the conductive connector 44 and the ends 76 of the third conductive trace 74 positioned on the centralizer 66. The electrical properties between additional centralizers (not shown) and the borehole wall 12 may be determined using additional conductive traces 46 on the exterior surface 34 that extend further longitudinally past the first and second conductive traces 48, 50 and centralizer 66. The embodiment shown in FIG. 4 may additionally be employed with cement 22 where the centralizers 66 allow for higher degree of resolution in the thickness of the cement sheath.

Figure 5:
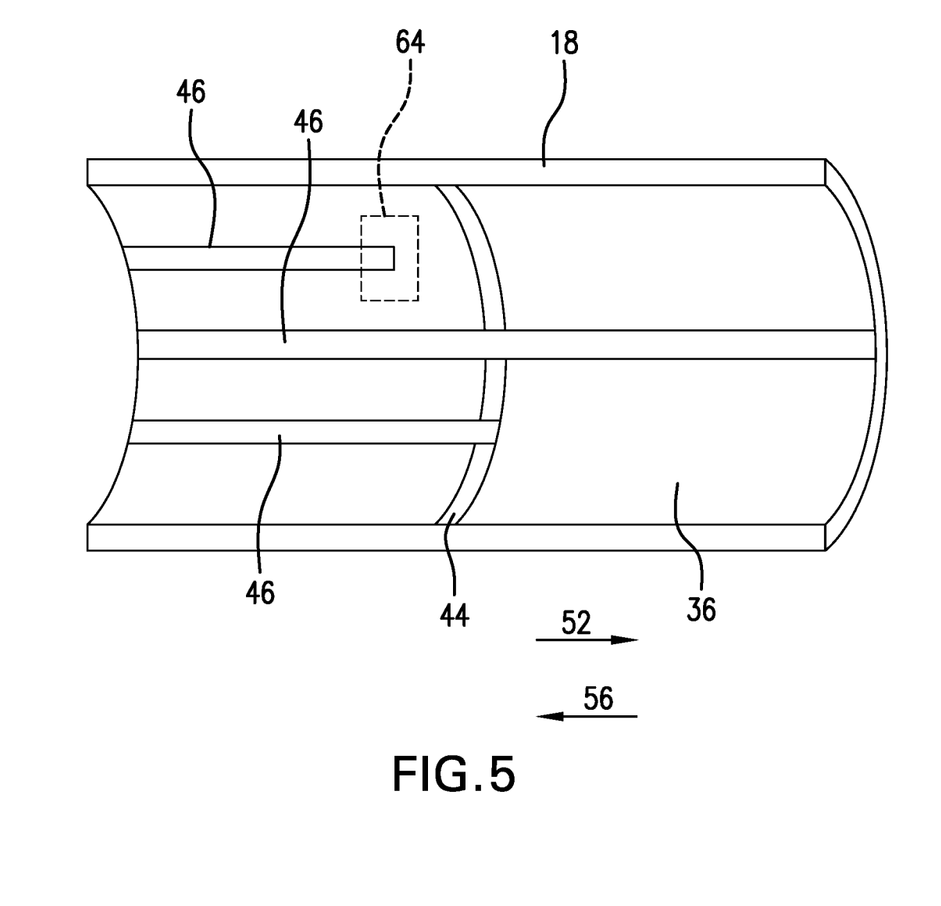
FIG. 5 depicts a perspective and cut-away view of a portion of an embodiment of a tubular for a tubular signal transmission system.
Figure 6:
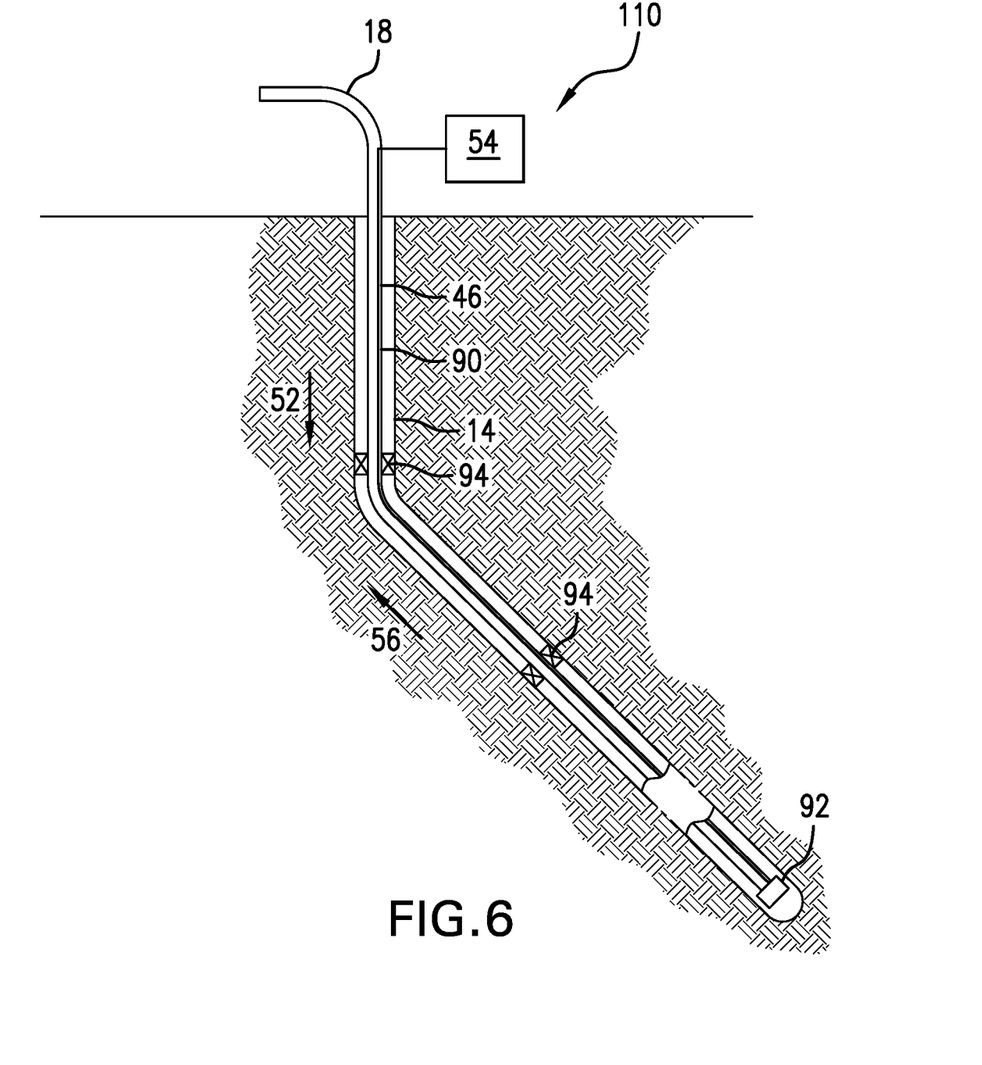
FIG. 6 depicts a side sectional and schematic view of an embodiment of a tubular signal transmission system using coiled tubing in a borehole.
Figure 7:
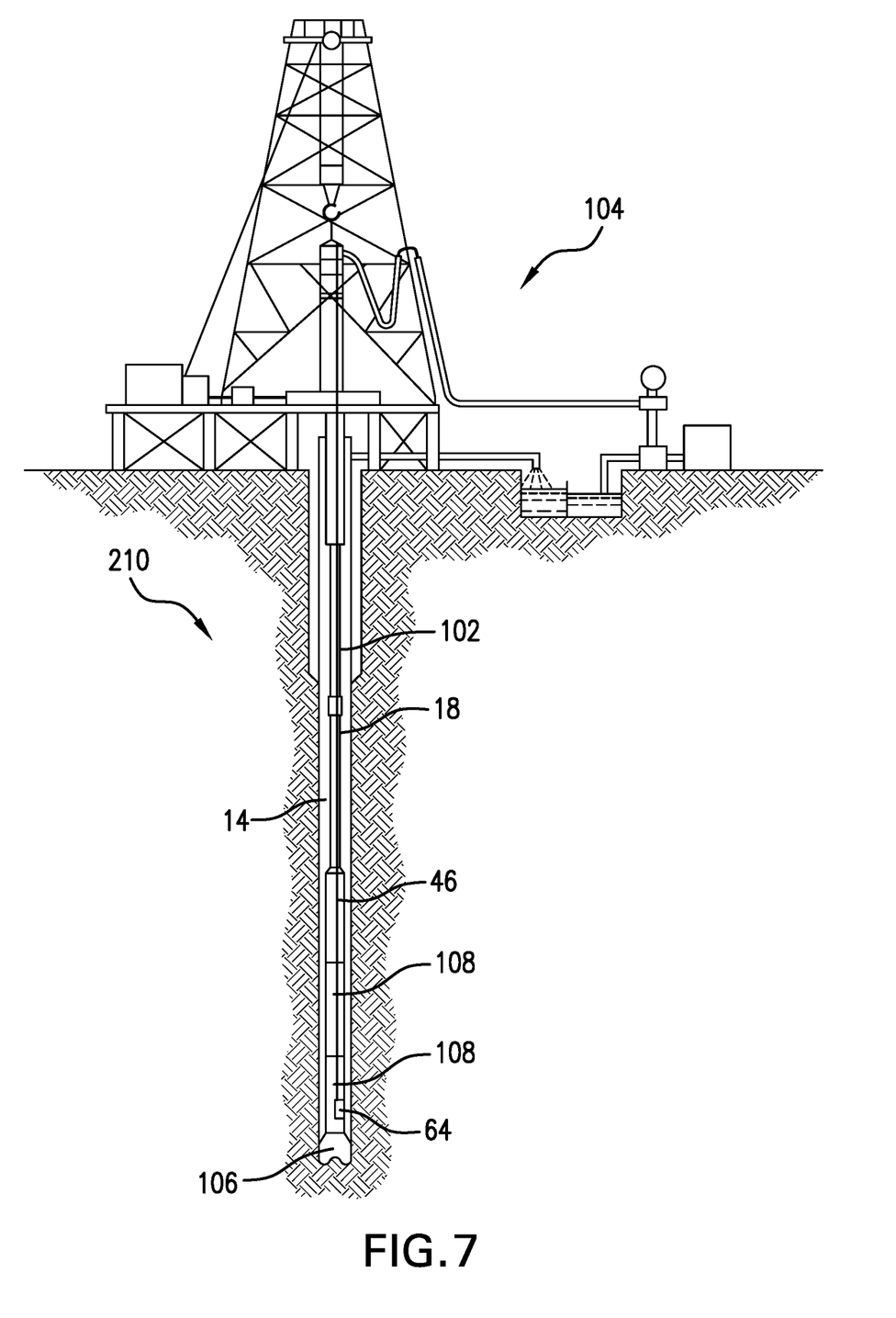
FIG. 7 depicts a side sectional and schematic view of an embodiment of a tubular signal transmission system using drill pipe; and, FIG. 8 depicts a side view of an embodiment of a tubular signal transmission system using a perforated tubular.

In an another embodiment, as shown in FIG. 5, in addition to or in lieu of the conductive traces 46 on the exterior surface 34 of the tubular 18, the conductive traces 46 and conductive connectors 44 may be painted, printed, or etched onto the interior surface 36 of the tubular 18. Interiorly applied conductive traces 46 may be particularly useful in a power transmission application where power may be supplied to one or more downhole devices 64, such as sensors or other devices, provided within the flowbore 38 (FIG. 1)

of the tubular 18, such as within coiled tubing 90 as shown in FIG. 6 and within drill pipe 102 as shown in FIG. 7. The conductive trace 46 can be attached to a variety of downhole devices 64, including any of a variety of sensors/tools, either on the interior surface 36 or exterior surface 34 of the tubular 18. The downhole device 64 may also be attached adjacent to an end of the tubular 18, and therefore on neither the surface 36, 34 of the tubular 18. Further, the conductive trace 46 may be used to deliver a sensed signal and/or power from and/or to the downhole device 64. With reference to FIG. 6, coiled tubing 90, as part of a tubular signal transmission system 110, is typically provided on a reel assembly and injected into the borehole 14 using an injector system (not shown). Packers 94, illustrated in their fully deployed and extended position in FIG. 6 to seal the coiled tubing 90 within the borehole 14, may be installed at locations along the coiled tubing 90 in an unextended position prior to deployment. A bottom hole assembly ("BHA") 92 may be attached to an end 94 of the coiled tubing 90 prior to conveying the coiled tubing 90 into the borehole 14. In some embodiments, tools, such as but not limited to, anchors, control valves, flow diverters, seal assemblies, pumps, sensors, or other apparatus and downhole devices 64 are conveyed using the coiled tubing 90. For the embodiment of the coiled tubing 90, because the coiled tubing 90 is injected into and withdrawn from the borehole 14 using an injector that includes gripper blocks configured to feed or withdraw the coiled tubing 90 from the borehole 14, to prevent damage to the traces 46, the traces 46 can be limited to the interior surface 36. Alternatively, if applied to the exterior surface 34, the trace 46 is positioned in an area of the coiled tubing 90 that will avoid contact with the gripper blocks to prevent damage to the trace 46. With reference to FIG. 7, a drilling assembly includes a drill pipe 102 supported by a derrick structure 104 as part of a tubular signal transmission system 210. The drill pipe 102 terminates in a drill bit 106 which is rotatable with respect to the borehole 14. The drill pipe 102 may be made of interconnected pipe segments to form the tubular 18. Drill collar segments 108 may include devices 64 including, but not limited to, sensors and electronic circuitry for preprocessing signals provided by the sensors, valves, and plungers to create pressure pulses. In any of the embodiments of a tubular 18, when the functionality of the downhole device 64 including tools, sensors, or other apparatus requires electrical communication, the conductive traces 46 may be utilized instead of having to additionally place a wireline cable within the coiled tubing 90, drill pipe 102, etc. In such an application, the conductive trace 46 designated for power signal delivery in the downhole direction 52 need not be electrically connected to any conductive connectors 44. The interiorly applied conductive traces 46 may also be used to transmit signals in the uphole direction 56 as previously described. The tubular 18 may include any combination of conductive traces 46 and conductive connectors 44 applied on one or both the interior surface 36 and the exterior surface 34. As the conductive traces 46 occupy little space within the interior of the tubular 18, the flowbore 38 is not blocked, and ample space remains within the flowbore 38 for hydraulics, production, injection, and tools.

Figure 8:
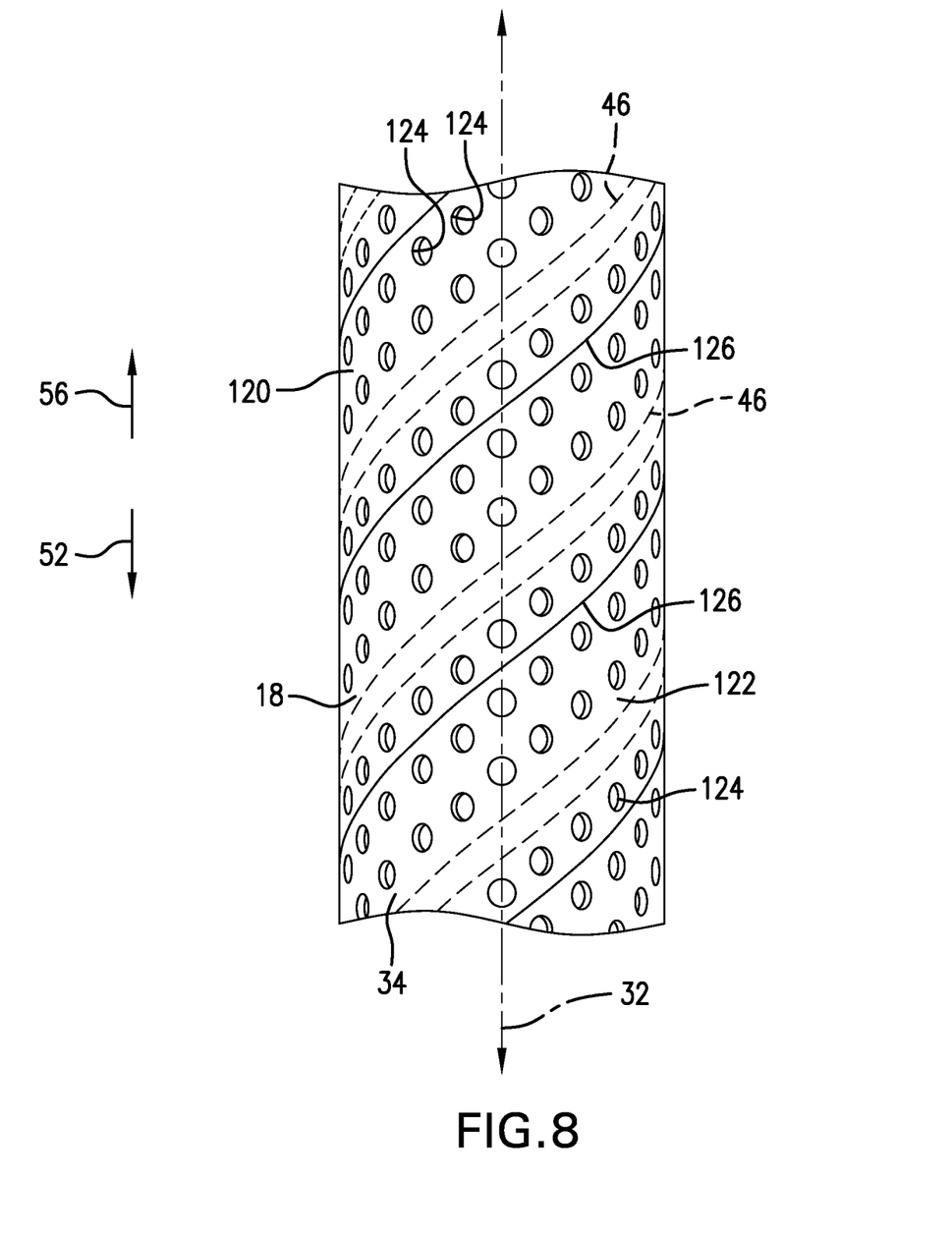

While the trace 46 has been previously illustrated as extending substantially parallel to the longitudinal axis 32 of the tubular 18, the trace 46 may also extend in other configurations such as, but not limited to, a helical pattern as shown in FIG. 8. In the illustrated embodiment, the helically extending trace 46 is positioned on the interior surface of the tubular 18, and is thus shown in phantom. However, the helically extending trace 46 may also be positioned on the exterior surface 34. The tubular 18 may be any tubular as previously described, although the tubular 18 shown in FIG. 8 is depicted as a protective shroud 120. In one embodiment, the shroud 120 may be formed from a strip 122 of material, and the strip 122 may be non-perforated or alternatively include apertures or perforations 124. The trace 46 may then be applied as a straight line onto the strip 122. The strip 122 may then be helically wound about the axis 32 and welded at sides thereof to create the tubular shroud 120 having helical weld 126. Although the trace 46 is applied as a straight line onto the strips 122, the trace 46 of the resultant shroud 120, whether on the exterior surface 34 or the interior surface, has a helical shape. The helically arranged trace 46 is useful as previously described for transmitting signals in either the uphole or downhole directions 52, 56 with respect to the tubular 18 and its placement with respect to surface 24 (FIG. 2).

Unlike traditional conductive cable that would have to be assembled onto or into a tubular 18 during the make-up of the tubular 18 on the surface 24 by personnel, the conductive material 58 for the conductive traces 46 and conductive connectors 44 can be applied offsite during the manufacture of the tubular 18. By completely eliminating the additional step of attaching a cable to the tubular 18 during make-up at the site, savings in time and money are realized. Also, the threat of having an attached conductive cable knocked off or broken during installation into a borehole 14 is eliminated. Additionally, the conductive material 58 can be applied substantially flush with either surface 34, 36, and therefore very little space is utilized, leaving more room for other downhole necessities such as cement 22, downhole tools and devices 64, and any interiorly positioned tubulars 18.

The conductive traces 46 can serve as transmission lines to transmit any sort of signals including sensed signals indicative of cement quality or signals from sensors and other downhole devices, which are sent in the uphole direction 52. Additionally, the conductive traces 46 are capable of receiving data signals that are deliverable in the downhole direction 56. Since the conductive traces 46 include a metallic conductive core 60, the conductive traces 46 are additionally capable of transferring electric power, unlike fiber optics.

Thus, embodiments described herein enable operators to analyze the condition and state of cement 22 based on measuring the change in electrical properties across two conductive traces 46. The proposed method includes utilizing a set of conductive traces 46 that are pre-applied on the tubular 18 (interior surface 36 or exterior surface 34) and aligned correctly during tubular makeup to provide a tubular signal transmission system 10. The conductive traces 46 allow an operator to collect electrical measurements from various depths and by plotting them over time and referencing them to laboratory measurements, the condition of the cement 22 can be determined. Additional methods of analyzing the cement 22 can also include utilization of conductive traces 46 on the centralizer 66. These methods allow real time continuous monitoring of the sheath of cement 22 in the borehole 14. The methods also allow operators to study/measure or evaluate the cement properties across the thickness of the cement 22. These methods eliminate the necessity of wireline that needs to run into the tubular 18 and eliminates substantial surface equipment and additional personnel. Embodiments described herein further allow signal transmission within an interior of any downhole tubular 18, such as within the interior of the coiled tubing 90, drill pipe 102, and other pipe segments and tubulars. Such signal transmission may, in one embodiment, include power transmission along the conductive traces 46. The embodiment of the tubular 18 including a centralizer 66 may be used alone or in combination with the embodiments previously described. That is, the tubular 18 may include conductive traces 46 disposed on any or all of the exterior surface 34, interior surface 36, and centralizer 66. Further, when the control system 54 includes or is connected to a remote data transmitter, multiple wells may be monitored remotely thus allowing for better analysis by experts while requiring less operators to support operation.

Set forth below are some embodiments of the foregoing disclosure:

Embodiment 1

A downhole system including: a tubular having a longitudinal axis; and a trace applied on the tubular, the trace including a conductive portion formed from an electrically conductive material, the trace configured to deliver a signal between uphole and downhole locations of the tubular.

Embodiment 2

The downhole system of any of the preceding embodiments, wherein the trace includes a conductive paint, a conductive ink, or a conductive film applied to an exterior surface and/or an interior surface of the tubular.

Embodiment 3

The downhole system of any of the preceding embodiments, wherein the trace is applied to the interior surface of the tubular.

Embodiment 4

The downhole system of any of the preceding embodiments, wherein the tubular is coiled tubing.

Embodiment 5

The downhole system of any of the preceding embodiments, wherein the tubular is drill pipe.

Embodiment 6

The downhole system of any of the preceding embodiments, further including a downhole device electrically connected to the trace, wherein the trace is configured to deliver electricity to the downhole device and/or transmit a signal from the downhole device.

Embodiment 7

The downhole system of any of the preceding embodiments, wherein the downhole device is a sensor.

Embodiment 8

The downhole system of any of the preceding embodiments, wherein the tubular is formed of a plurality of tubular sections, a portion of the trace applied on each tubular section, the tubular sections connected together to align and electrically connect ends of adjacent trace portions to each other.

Embodiment 9

The downhole system of any of the preceding embodiments, wherein the trace includes a first trace and a second trace, the second trace radially spaced from the first trace.

Embodiment 10

The downhole system of any of the preceding embodiments, further comprising a first conductive connector electrically connected to the first trace and applied on the tubular, and a second conductive connector electrically connected to the second trace and applied on the tubular.

Embodiment 11

The downhole system of any of the preceding embodiments, wherein the first and second conductive connectors are ring-shaped.

Embodiment 12

The downhole system of any of the preceding embodiments, wherein the first and second traces include a non-conductive layer and the first and second conductive connectors do not include the non-conductive layer.

Embodiment 13

The downhole system of any of the preceding embodiments, wherein the first and second traces and the first and second conductive connectors are on an exterior surface of the tubular, further comprising a sheath of cement surrounding the tubular, the first and second conductive connectors, and the first and second traces.

Embodiment 14

The downhole system of any of the preceding embodiments, wherein the first and second traces extend substantially parallel to the longitudinal axis of the tubular, the first and second traces have different lengths, the downhole system is disposable in a borehole extending from a surface, and the first trace extends further from the surface than the second trace.

Embodiment 15

The downhole system of any of the preceding embodiments, further comprising a centralizer disposed on an exterior surface of the tubular, and a third conductive trace electrically connected to the first conductive trace and extending along at least one spacer of the centralizer.

Embodiment 16

The downhole system of any of the preceding embodiments, wherein the trace is helically arranged with respect to the longitudinal axis of the tubular.

Embodiment 17

A method of signal transmission along a downhole tubular, the method including: positioning the tubular within a borehole; and, delivering a signal along an electrically conductive trace painted, etched, or printed on an interior surface and/or an exterior surface of the tubular.

Embodiment 18

The method of any of the preceding embodiments, wherein delivering the signal includes delivering an electric power signal in a downhole direction to a downhole device electrically connected to the trace.

Embodiment 19

The method of any of the preceding embodiments, wherein the tubular is coiled tubing or drill pipe and delivering the signal includes delivering the signal on the interior surface of the tubular.

Embodiment 20

The method of any of the preceding embodiments, further including cementing the tubular within the borehole, wherein the trace includes first and second traces extending at different depths within the borehole and along an exterior surface of the tubular, and delivering the signal includes delivering signals in an uphole direction indicative of condition of cement.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A downhole system including:
   a tubular having a longitudinal axis;
   a trace applied on the tubular, the trace including a first trace and a second trace that is radially spaced from the first trace, each of the first trace and the second trace including a conductive portion formed from an electrically conductive material, each of the first trace and the second trace being configured to deliver a signal between uphole and downhole locations of the tubular;
   a first conductive connector electrically connected to the first trace and applied on the tubular; and
   a second conductive connector electrically connected to the second trace and applied on the tubular, wherein the first and second traces include a non-conductive portion and the first and second conductive connectors do not include the non-conductive portion.

2. The downhole system of claim 1, wherein the trace includes a conductive paint, a conductive ink, or a conductive film applied to an exterior surface and/or an interior surface of the tubular.

3. The downhole system of claim 1, wherein the trace is applied to the interior surface of the tubular.

4. The downhole system of claim 3, wherein the tubular is coiled tubing.

5. The downhole system of claim 3, wherein the tubular is drill pipe.

6. The downhole system of claim 3, further comprising a downhole device electrically connected to the trace, wherein the trace is configured to deliver electricity to the downhole device and/or transmit a signal from the downhole device.

7. The downhole system of claim 6, wherein the downhole device is a sensor.

8. The downhole system of claim 1, wherein the tubular is formed of a plurality of tubular sections, a portion of the trace applied on each tubular section, the tubular sections connected together to align and electrically connect ends of respective adjacent trace portions to each other.

9. The downhole system of claim 1, wherein the first and second conductive connectors are ring-shaped.

10. The downhole system of claim 1, wherein the first and second traces and the first and second conductive connectors are on an exterior surface of the tubular, and further comprising a sheath of cement surrounding the tubular, the first and second conductive connectors, and the first and second traces.

11. The downhole system of claim 1, wherein the first and second traces extend substantially parallel to the longitudinal axis of the tubular, the first and second traces have different lengths, the downhole system is disposable in a borehole extending from a surface, and the first trace extends further from the surface than the second trace.

12. The downhole system of claim 1, further comprising a centralizer disposed on an exterior surface of the tubular, and a third trace electrically connected to the first trace and extending along at least one spacer of the centralizer.

13. The downhole system of claim 1, wherein the trace is helically arranged with respect to the longitudinal axis of the tubular.

14. A method of signal transmission along a downhole tubular, the method comprising:
   positioning the tubular within a borehole;

delivering a signal along an electrically conductive trace painted, etched, or printed on an interior surface and/or an exterior surface of the tubular; and cementing the tubular within the borehole, wherein the trace includes first and second traces extending at different depths within the borehole and along an exterior surface of the tubular, and delivering the signal includes delivering signals in an uphole direction indicative of condition of cement.

15. The method of claim 14, wherein delivering the signal includes delivering an electric power signal in a downhole direction to a downhole device electrically connected to the trace.

16. The method of claim 15, wherein the tubular is coiled tubing or drill pipe and delivering the signal includes delivering the signal on the interior surface of the tubular.

* * * * *